Patented Aug. 7, 1923.

1,464,044

UNITED STATES PATENT OFFICE.

ROBERT A. MARR, JR., OF NORFOLK, VIRGINIA, ASSIGNOR OF ONE-HALF TO ROBERT A. MARR, OF NORFOLK, VIRGINIA.

PRESERVED WOOD AND PROCESS OF MAKING SAME.

No Drawing. Application filed July 11, 1918, Serial No. 244,465. Renewed December 30, 1922.

*To all whom it may concern:*

Be it known that ROBERT A. MARR, Jr., a citizen of the United States of America, residing at Norfolk, in the county of Norfolk and State of Virginia, has invented certain new and useful Improvements in Preserved Wood and Processes of Making Same, of which the following is a specification.

The present invention concerns a new process of preserving wood by impregnating the same with a particular mixture of material, whereby its cells, ducts and pores are encysted with a mixture which hardens upon cooling, and thereby prevents the ingress of wood-destroying organisms, and which mixture is impervious to moisture, and which also carries a material capable of preventing the boring action of marine wood-destroying worms, such as the *Teredo navalis* and *Limnoria*, and the invention embraces not only the process but the product as well. The wood treated as herein described is of especial interest for use in places where it comes into contact with sea water, as piling, wharves, boats, ships, buoys, etc.

The process of the present invention consists in impregnating the wood, either as logs, piles, planks, boards, or other articles, with a material containing, for example, (by weight),

| | Parts. |
|---|---|
| Paraffin wax | 15 |
| Fuel oil of paraffin base | 12 to 15 |
| Asphalt | 20 to 25 |
| Fuel oil of asphalt base | 12 to 15 |
| Creosote, (coal tar) from which the naphthalene has been removed | 10 to 15 |
| Rosin | 10 to 12 |
| Diatomaceous earth, (90% passing a 200 mesh screen) | 1 |

Of the above materials, the entire list may be used, or the paraffin and paraffin-base oil may be omitted, or the asphalt and asphalt-base oil may be omitted. These two pairs of materials seem to supplement each other, and either or both pairs thereof may be used in the mixture. I prefer to employ both pairs, for general purposes, but if color is objectionable, I can omit the asphalt and asphalt-base oil. Since paraffin and paraffin-base oil are more expensive, I may omit these, and if either pair of materials is omitted, I prefer to employ the other in about double the amount above stated.

In carrying my process into effect, I prefer to mix the paraffin and paraffin-base oil, hot, by stirring. I prefer to separately mix the asphalt and asphalt-base oil, also hot. The diatomaceous earth is then added. I prefer to separately mix the creosote (the naphthalene having preferably been removed therefrom) with the rosin. The rosin-creosote mixture is then added to the mixture of other materials.

The wood, which may be green (seasoning not being necessary) is then preferably immersed in the bath of the mixture while such mixture is hot, and the mixture maintained hot until the desired amount of impregnation is effected, the length of time depending upon various conditions, such as size, water content, and closeness of texture of the wood, temperature of the bath, and other conditions. The impregnation may be, and for wood to be used in sea water, is preferably complete. For posts, piles, etc., the wood may be stood on end in the hot bath, of a depth sufficient to impregnate a part only of the length of the pieces.

Without limiting myself to particular temperatures, I mention as especially suitable a temperature of 120 to 140° C., for the bath, and at this temperature the impregnation is rapid and complete. For a very heavy impregnation, I may employ the temperatures above stated, and allow the bath to cool, nearly to the solidification temperature of the mixture composing the bath before removing the wood from the bath.

My process is applicable to all varieties of wood, and I call attention to the simplicity of the process. It is not necessary to employ costly - pressure resisting treating receptacles, air compressors, vacuum pumps, etc., as are usually necessary, to effect a substantially complete impregnation with creosote. The materials used are all relatively cheap and easily obtainable in large quantities. The process is accordingly very economical.

In some of the appended claims, the term "solidifiable petroleum base" is intended to cover both paraffin and asphalt. Where I refer to the use of "creosote from which the naphthalene has been removed", I intend to imply that all or a considerable part of the naphthalene has been removed therefrom. In practice absolutely every last trace of this material cannot be removed, and if some of the naphthalene remains, it is of no material disadvantage. The wood-preserving industry generally will not accept this material, but it works very well in the present process.

In addition to the materials above mentioned, other materials can be added to produce special effects, and I intend for the claims to cover the addition or omission of such other materials.

While the diatomaceous earth, (kieselguhr) is not soluble in the menstruum, it is such a fine powder that it is carried into the smallest cavities of the wood. The material is so fine that it will penetrate wherever the liquids penetrate. This has been demonstrated by microscopic examination of the cell contents of treated wood, taken near the center of relatively large pieces.

When the wood is removed from the bath, the absorbed material solidifies, filling the cells and cavities with an impenetrable deposit, that will effectively prevent the entrance of wood-destroying agencies. This also adds strength and resiliency to the wood.

In the above example, I have given the proportions that I have found most useful, but I do not limit myself to these proportions.

Fuel oil, as used herein, is intended to mean petroleum oil from which the gasoline and kerosene (and if desired also some of the heavier fractions) have been removed. Crude petroleum could be used, but the gasoline and perhaps some of the other fractions would be lost. The use of crude oil would also add to the fire risk, and would be inferior, since the lighter fractions will not readily solidify, and would not remain permanently. Fuel oil is accordingly to be recommended.

I claim:—

1. A process of preserving wood, comprising the impregnation thereof with a solidifiable material, fluid when hot, comprising a "solidifiable petroleum base" and a petroleum oil of that base, creosote, rosin and diatomaceous earth.

2. Wood impregnated with a resolidified mixture comprising a "solidifiable petroleum base" a petroleum oil of that base, creosote, rosin and diatomaceous earth.

3. A process of preserving wood which comprises impregnating with a material comprising asphalt, asphalt-base oil, creosote from which a material part of the naphthalene content has been removed, diatomaceous earth and rosin.

4. Wood impregnated with asphalt, asphalt-base oil, denaphthalenated creosote, rosin and diatomaceous earth.

5. A process of preserving wood comprising the impregnation thereof with a solidifiable material, fluid when hot, comprising a "solidifiable petroleum base", and a petroleum oil of that base, rosin, diatomaceous earth, and creosote from which a material part at least of the naphthalene content has been removed.

6. Wood impregnated with a resolidified mixture comprising a "solidifiable petroleum base", a petroleum oil of that base, rosin, diatomaceous earth and creosote from which a material part at least of the naphthalene content has been removed.

In testimony whereof I affix my signature.

ROBERT A. MARR, Jr.